(12) United States Patent
Schmidt et al.

(10) Patent No.: US 6,744,842 B2
(45) Date of Patent: Jun. 1, 2004

(54) FUEL ASSEMBLY FOR A PRESSURIZED-WATER REACTOR

(75) Inventors: Norbert Schmidt, Coburg (DE); Peter Rau, Leutenbach (DE); Erika Herzog, Lonnerstadt (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/247,573

(22) Filed: Sep. 19, 2002

(65) Prior Publication Data

US 2003/0053583 A1 Mar. 20, 2003

(30) Foreign Application Priority Data

Sep. 19, 2001 (DE) .......................... 101 46 128

(51) Int. Cl.⁷ ............................................... G21C 3/352
(52) U.S. Cl. ..................... 376/434; 376/438; 376/441; 376/442; 376/445; 376/446; 376/448; 376/449; 376/409; 376/412; 376/426; 376/285; 376/462
(58) Field of Search ................................ 376/434, 438, 376/441, 442, 409, 412, 426, 445, 446, 448, 449, 462, 285

(56) References Cited

U.S. PATENT DOCUMENTS

| | | | | |
|---|---|---|---|---|
| 3,423,287 A | * | 1/1969 | Anthony et al. | 376/442 |
| 3,607,640 A | * | 9/1971 | Krawiec | 376/442 |
| 3,715,275 A | * | 2/1973 | Krawiec | 376/442 |
| 3,820,225 A | * | 6/1974 | Iwao et al. | 29/428 |
| 3,852,154 A | * | 12/1974 | Carlson et al. | 376/442 |
| 3,940,314 A | * | 2/1976 | Knodler et al. | 376/442 |
| 4,058,436 A | * | 11/1977 | Anthony | 376/442 |
| 4,059,483 A | | 11/1977 | Anthony | 176/78 |
| 4,135,972 A | * | 1/1979 | Anthony et al. | 376/442 |
| 4,295,935 A | | 10/1981 | Anthony | 376/285 |

(List continued on next page.)

FOREIGN PATENT DOCUMENTS

| | | | |
|---|---|---|---|
| EP | 0103444 | * | 3/1984 |
| EP | 000557085 | * | 8/1993 |
| GB | 998625 | * | 7/1965 |
| GB | 2064202 | * | 6/1981 |
| GB | 2089555 | * | 6/1982 |
| JP | 406102386 | * | 4/1994 |

OTHER PUBLICATIONS

Australian Stainless Steel Development Association, ACN 061226051 Thermal properties of austenitics– <http://www.assda.asn.au/austenit.html>.*

(List continued on next page.)

*Primary Examiner*—Michael J. Carone
*Assistant Examiner*—John Richardson
(74) *Attorney, Agent, or Firm*—Laurence A. Greenberg; Werner H. Stemer; Ralph E. Locher

(57) ABSTRACT

A fuel assembly for a pressurized-water reactor includes fuel rods held in cells of spacers, control rod guide tubes, and a headpiece and a foot piece, by which it is fixed to upper and lower core grids, respectively. A spacer having a first part, which lies on a radially outer side with respect to a longitudinal center axis of the fuel assembly, and a second part, which lies on a radially inner side and is completely surrounded by the first part are included to reduce the size of gaps between fuel assemblies. The second part is formed of Zircaloy. The first part is made of a metallic material, and when compared to the Zircaloy of the second part, has a lower growth in the radial direction, caused by neutron radiation and a higher coefficient of thermal expansion.

10 Claims, 8 Drawing Sheets

U.S. PATENT DOCUMENTS

| | | | | |
|---|---|---|---|---|
| 4,325,786 A | | 4/1982 | Wohlsen | 376/442 |
| 4,418,036 A | * | 11/1983 | Gjertsen et al. | 376/438 |
| 4,547,335 A | * | 10/1985 | Downs et al. | 376/442 |
| 5,085,827 A | * | 2/1992 | Johansson et al. | 376/444 |
| 5,089,221 A | * | 2/1992 | Johansson et al. | 376/442 |
| 5,209,899 A | * | 5/1993 | Johansson et al. | 376/442 |
| 5,267,291 A | * | 11/1993 | Matzner et al. | 376/442 |
| 5,434,898 A | * | 7/1995 | Barkhurst | 376/438 |

OTHER PUBLICATIONS

Erradi et al, "Validation of the updated WIMS/D libraries based on ENDF/B6 data for the reactoivity temperature coefficients and comparison of APPOLLO code results" <erradi@fsr.ac.ma>.*

Material Inforrmation INCONEL@ alloy 718 –Heat resisting alloy–Ni53 /Fe19/Cr19/Nb/Mo/Ti <http://www.goodfellow.com>.*

Kaufman, "Nuclear Reactor Fuel elements–metallurgy and fabrication" Interscience Publishers, 1962, pp315.*

Smith et al "Vanadium alloys for radiative divertor program of D!!!–D★" Argonne National Laboratory, US.DOE contract No. DE–ACO3–89ER51114, W–31–109–ENG–38.*

Inconel Filler metal 617, Special Metals–Welding Products Company <www.specialmetalswelding.com>.*

Metallurgical and Materials, Conference Nov. 1996, vol. 27A, No. 11, Nov. 1996.*

* cited by examiner

FUEL ASSEMBLY FOR A PRESSURIZED-WATER REACTOR

BACKGROUND OF THE INVENTION

Field of the Invention

The invention relates to a fuel assembly for a pressurized-water reactor.

Several spacers are distributed over the length of the fuel rod to laterally fix the fuel rod bundle of a fuel assembly. On its underside, the fuel assembly has a foot piece, on the upper side of which the fuel rods are supported. A headpiece is provided at the top of the fuel assembly. If the fuel assemblies are installed in a reactor pressure vessel, they are disposed between a lower core grid and an upper core grid, fixing pins, which engage in bores at the foot piece and headpiece, projecting from the core grids. The core grids and the head and foot parts are usually produced from austenitic steel.

Two main materials are used for the spacers, namely austenitic steel and Zirconium alloy ("Zircaloy"). Zircaloy contains tin, iron, chromium and optionally nickel, in addition to zirconium as its main constituent. Since austenitic steel has a relatively high neutron absorption, Zircaloy spacers are generally used. The two materials have different thermal expansions. The coefficient of thermal expansion of Zircaloy is approximately $5 \times 10^{-6}$ mm/mm °C., while austenitic steels have a coefficient of thermal expansion of approximately $18 \times 10^{-6}$ mm/mm °C.

Therefore, the spacers expand to a lesser extent than the core grids in the horizontal or radial direction, so that the gap spaces, which are present between the individual fuel assemblies, increase in size when heated to operating temperature.

However, a particular drawback of this is that the degree of freedom for lateral bending of the fuel assemblies (for example, caused by non-uniform pressure conditions) is increased. This may lead not only to the bending of an individual fuel assembly, but also the bending of all the fuel assemblies on one radius, (i.e., all the fuel elements disposed in a line within the inner wall of the core shroud).

Thus, deviations of 10–20 mm from the set position may arise (in the central region of the fuel assembly) as a result of the cumulative increased gap spaces. With fuel assemblies, which have been deformed in this manner, it is difficult for control rods to move into the guide tubes, and an emergency shutdown of the reactor may be delayed. Furthermore, there is a change in the moderation conditions which were originally present, which leads to undesirable power changes.

The degree of freedom of bending for a fuel assembly is increased not only by the different thermal expansion between spacer and core grid, but also by two further effects. A loading gap of approximately 1 mm is required between the fuel assemblies to allow safe loading and unloading of the reactor. In other words, the edge length or spacer pitch is smaller by this amount than the pitch of the core grids.

A further effect, which increases the size of the gap, results from the property of Zircaloy of growing under neutron irradiation. The growth may also be directed radially outward, so that, after prolonged neutron irradiation, the spacers have a larger pitch than in the starting state.

Although (after a prolonged operating period) the increase in the size of the gap space based on different coefficients of thermal expansion is partially compensated for in the operating state, a radially grown spacer would reduce the size of the loading gap (in the cooled unloading state of the reactor) and make it difficult to remove fuel assemblies which are to be exchanged. To avoid this, spacers with a reduction in pitch, which corresponds to the growth are provided from the outset. Therefore, the reduction in the pitch of the spacer of a fresh fuel assembly (i.e., during the initial operating phase in which noticeable growth of the spacers has not yet taken place) leads to an increase in the size of the gap spaces that are present between the fuel assemblies.

Conventionally, the approach taken to solve the above-problems was to configure the fuel assembly structure as torsionally rigid as possible. In particular, the wall thickness of the control rod guide tubes was increased, and the connection between the guide tubes and the spacers was reinforced.

SUMMARY OF THE INVENTION

It is accordingly an object of the invention to provide a fuel assembly for a pressurized-water reactor that overcomes the hereinafore-mentioned disadvantages of the heretofore-known devices of this general type and that counteracts an increase in the size of the gap space, which is present between the fuel assemblies which are installed in a reactor pressure vessel without requiring reinforcing measures for the fuel assembly structure.

With the foregoing and other objects in view, there is provided, in accordance with the invention, at least one spacer, which is preferably positioned in a central region of the fuel assembly, and is formed from a first part, which lies on the radially outer side with respect to the longitudinal center axis of the fuel assembly. A second, radially inner part is also provided. The second part is made of Zircaloy and the first part is made of a metallic material which, when compared to Zircaloy, has a lower growth in the radial direction, caused by neutron radiation and a higher coefficient of thermal expansion.

When compared with a conventional spacer (which is entirely made of Zircaloy), in the present invention, the outer, first spacer part expands to a greater extent when heated to operating temperature. The result is that the difference in thermal expansion between the spacer and core grid is reduced compared to the conventional configuration. The closer the coefficient of expansion of the material of the first part to the coefficient of thermal expansion of the core grid material, the more pronounced the reduction becomes.

If there is not a certain play between the first and the second part right from the outset, a play of this type is formed on account of the greater thermal expansion of the outer part. Therefore, radial growth of the inner part caused by neutron radiation is possible without any radial widening of the outer part. Thus, the growth of the inner part has no effect on the pitch of the spacer.

Accordingly, a reduction in the pitch of the spacer, which compensates for growth and increases the size of the gap spaces between the fuel elements, is not necessary for a fresh fuel assembly. Therefore, the initial gap space between the fuel assemblies can be limited to the loading gap. In this case, only a different thermal expansion between the core grids and the outer part of the spacer has the effect of increasing the size of the gap space.

However, if the outer part of the spacer is made of the same material as the core grids (e.g., austenitic steel), the extent to which the size of the gap space is increased as a result of heating is reduced. Therefore, the gap spaces between the fuel assemblies are limited substantially to the loading gap, even at the operating temperature.

In accordance with another feature of the invention, the first and second parts are separate parts, which are not fixedly connected to one another. Individual cells are disposed on the inner side of the outer part to ensure that the outer part is fixed to radially outer control rod guide tubes. The second part is then fixed to control rod guide tubes that lie further toward the inside. Thus, there is no need for a connection between the two parts.

In accordance with a further feature of the invention, the second part is formed from webs, which are fitted crosswise into one another. Several of the webs are composed of two partial webs, which are separated from one another in the axial direction (i.e., they leave an intermediate space between them, which extends over the entire web length).

An expansion web, which is formed of the same material as the first part, is provided in the intermediate space. The ends of the expansion web are fixed to the inner side of the first part. The first part is mechanically connected to the second part through this configuration. The expansion webs are dimensioned in such a way that a relative movement between them and the partial webs is possible. When heated to operating temperature, the expansion webs expand (so does the first part connected to them), so that the increase in the size of the gap between the fuel assemblies caused by the thermal expansion of the core grids is at least partially compensated for.

In accordance with an added feature of the invention (so as to use a material, which has the lowest possible neutron absorption (in particular austenitic steel)), the first part the first part is a frame formed of edge webs only.

In accordance with an additional feature of the invention, there is provided a positively locking connection acting in a longitudinal direction of a corresponding one of said edge webs.

Although the frame is connected to the second part via the expansion webs, which are interwoven into the grid of the second part to increase the mechanical stability of the spacer further, in accordance with a concomitant feature of the invention, the end regions of some of the webs and partial webs are secured against lateral tilting at the first part by a positively locking connection acting in the longitudinal direction of the respective edge web. Such a connection between the webs or the partial webs and the frame allows a relative movement between the webs or the partial webs and the frame in the longitudinal direction of the webs. Therefore, the frame can expand without obstacle when it is heated to operating temperature.

Other features which are considered as characteristic for the invention are set forth in the appended claims.

Although the invention is illustrated and described herein as embodied in a fuel assembly for a pressurized-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PROFFERED EMBODIMENTS

Figure 1:
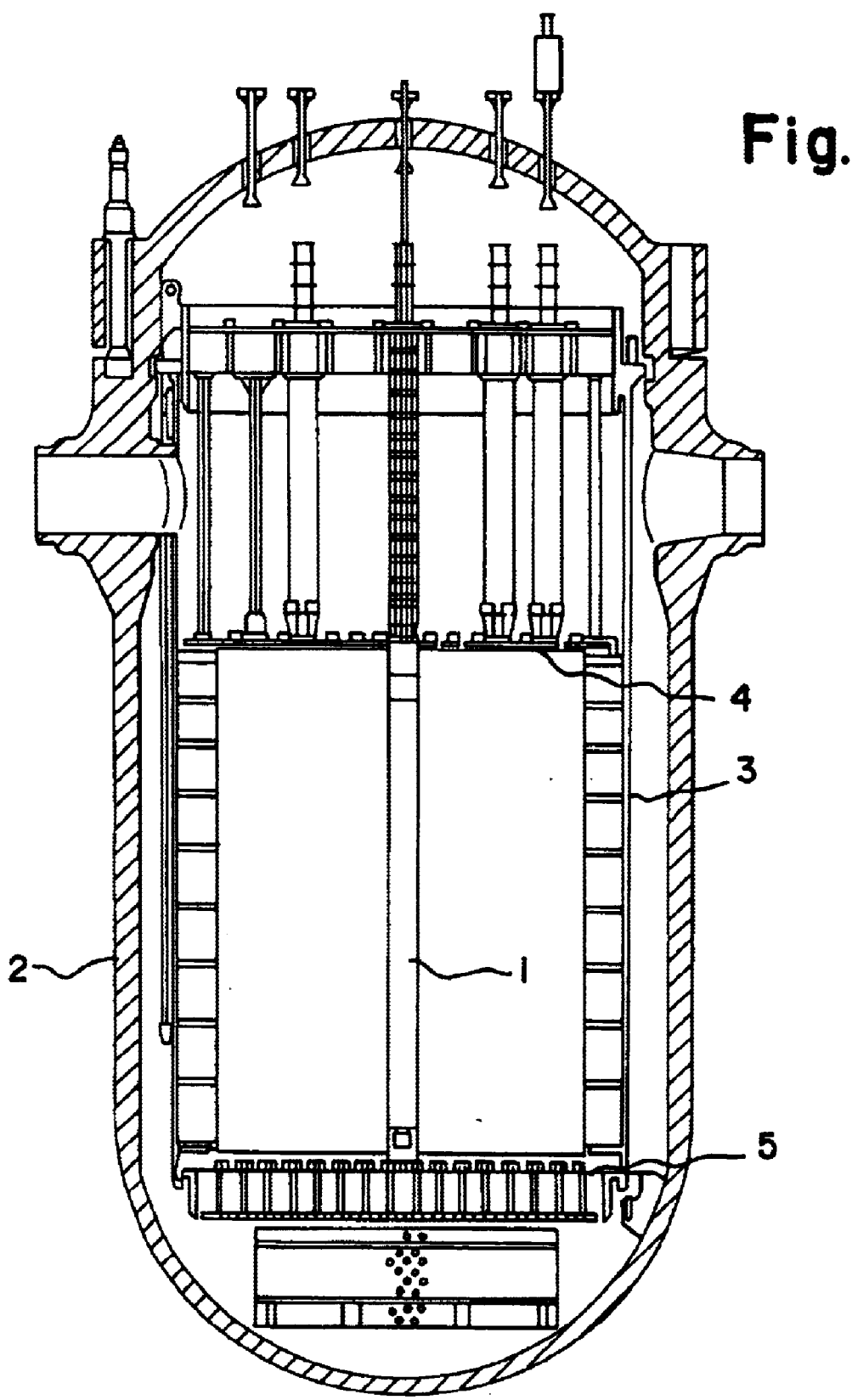
FIG. 1 is a diagrammatic longitudinal sectional view of a reactor pressure vessel.
Figure 2:
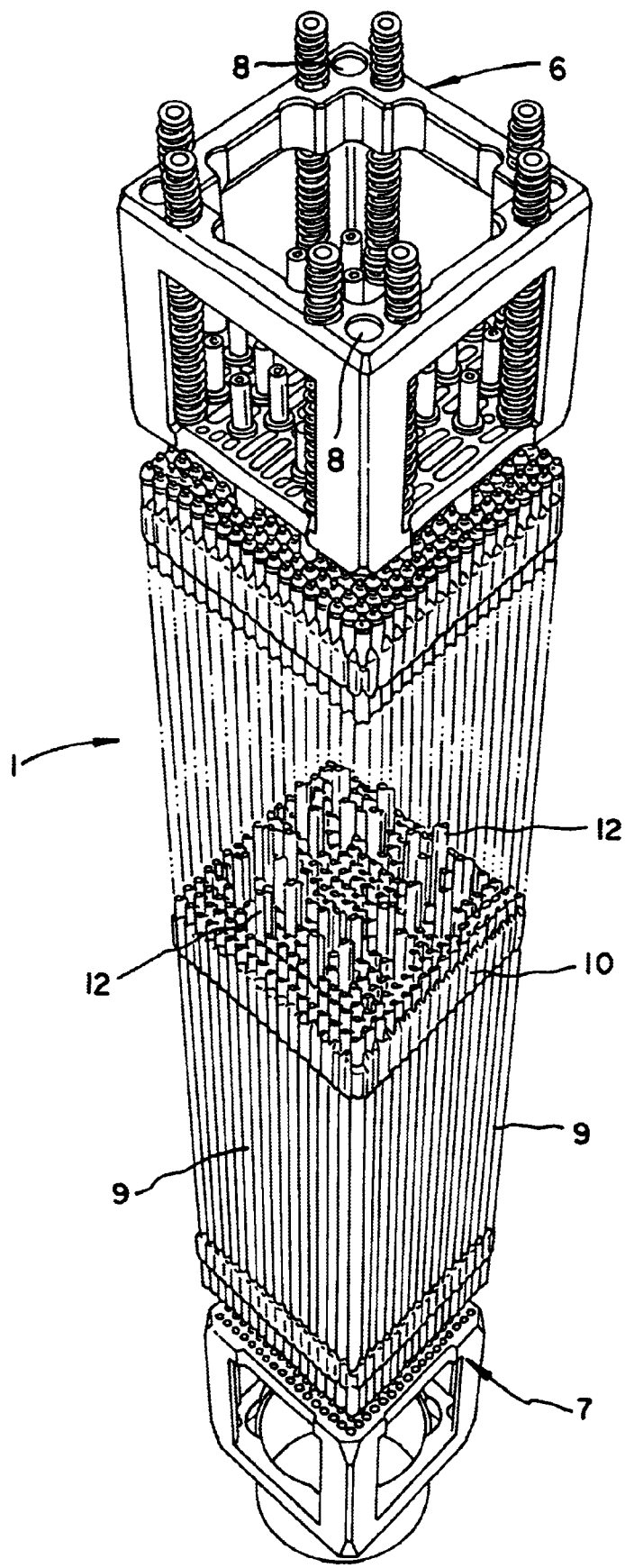
FIG. 2 is an illustration of a fuel assembly of a boiling-water reactor.
Figure 3:
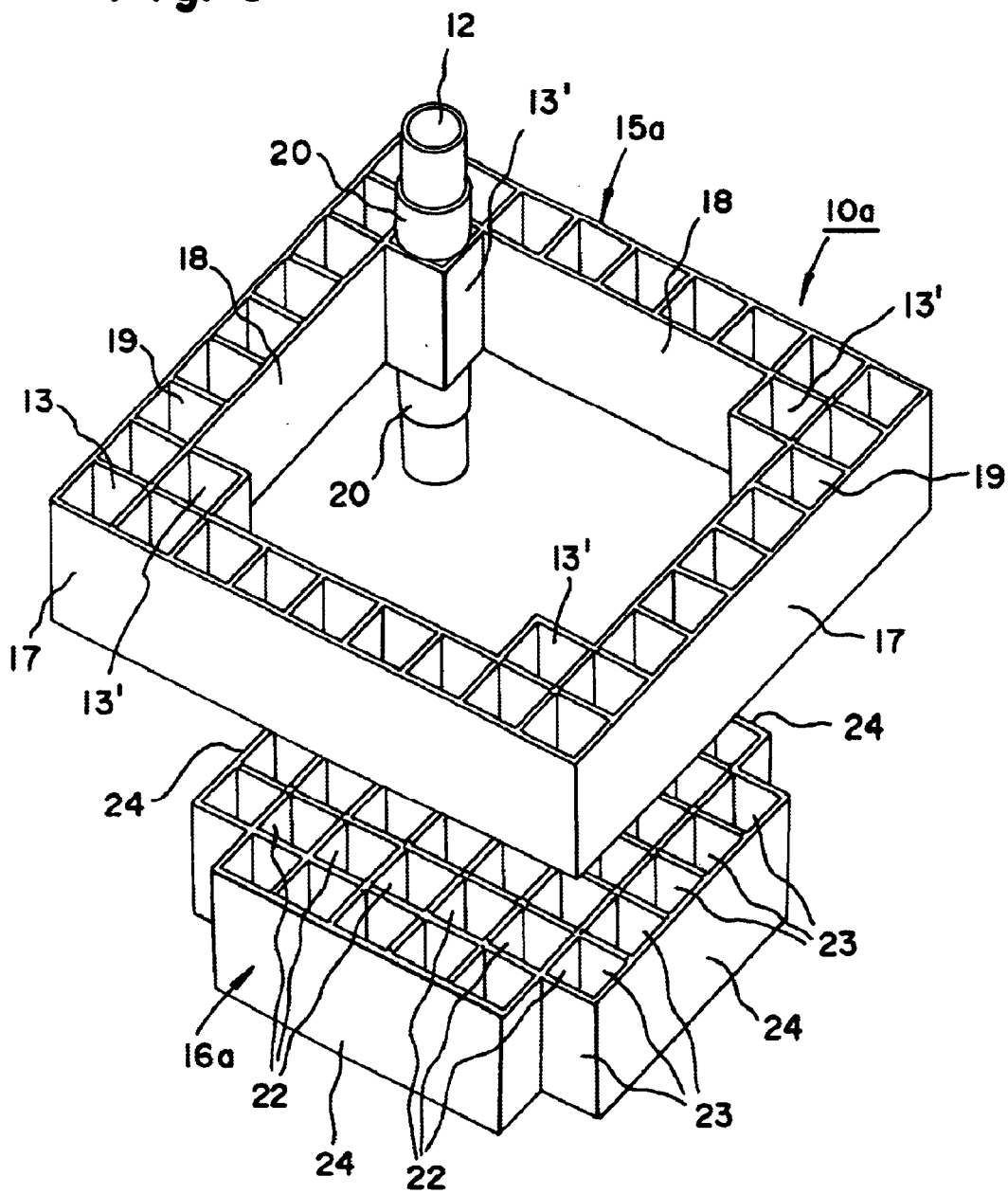
FIG. 3 is a diagrammatic perspective view of two parts of a first exemplary embodiment of a spacer.
Figure 4:
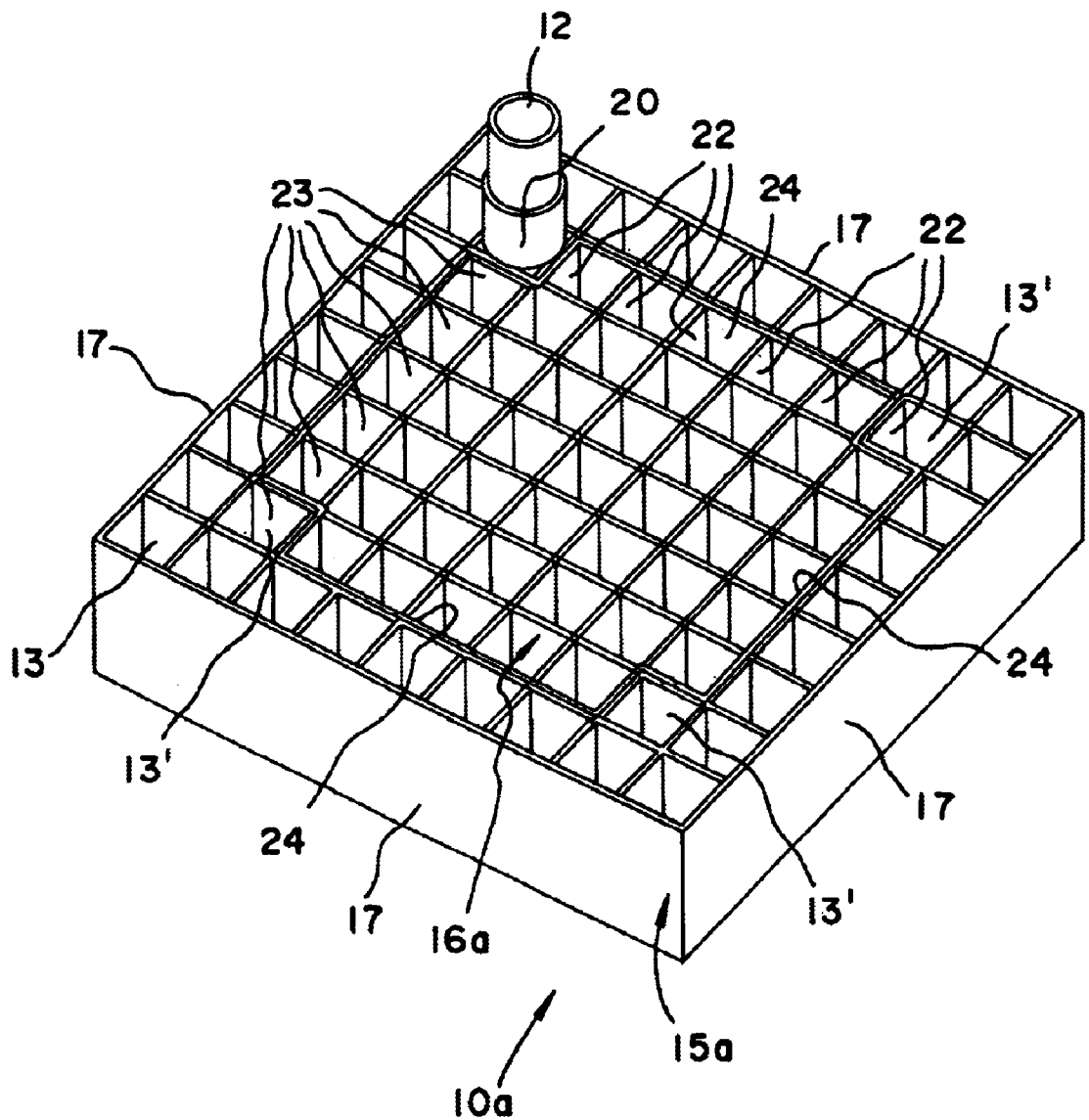
FIG. 4 is a diagrammatic perspective view of the spacer of FIG. 3 in an assembled state.
Figure 5:
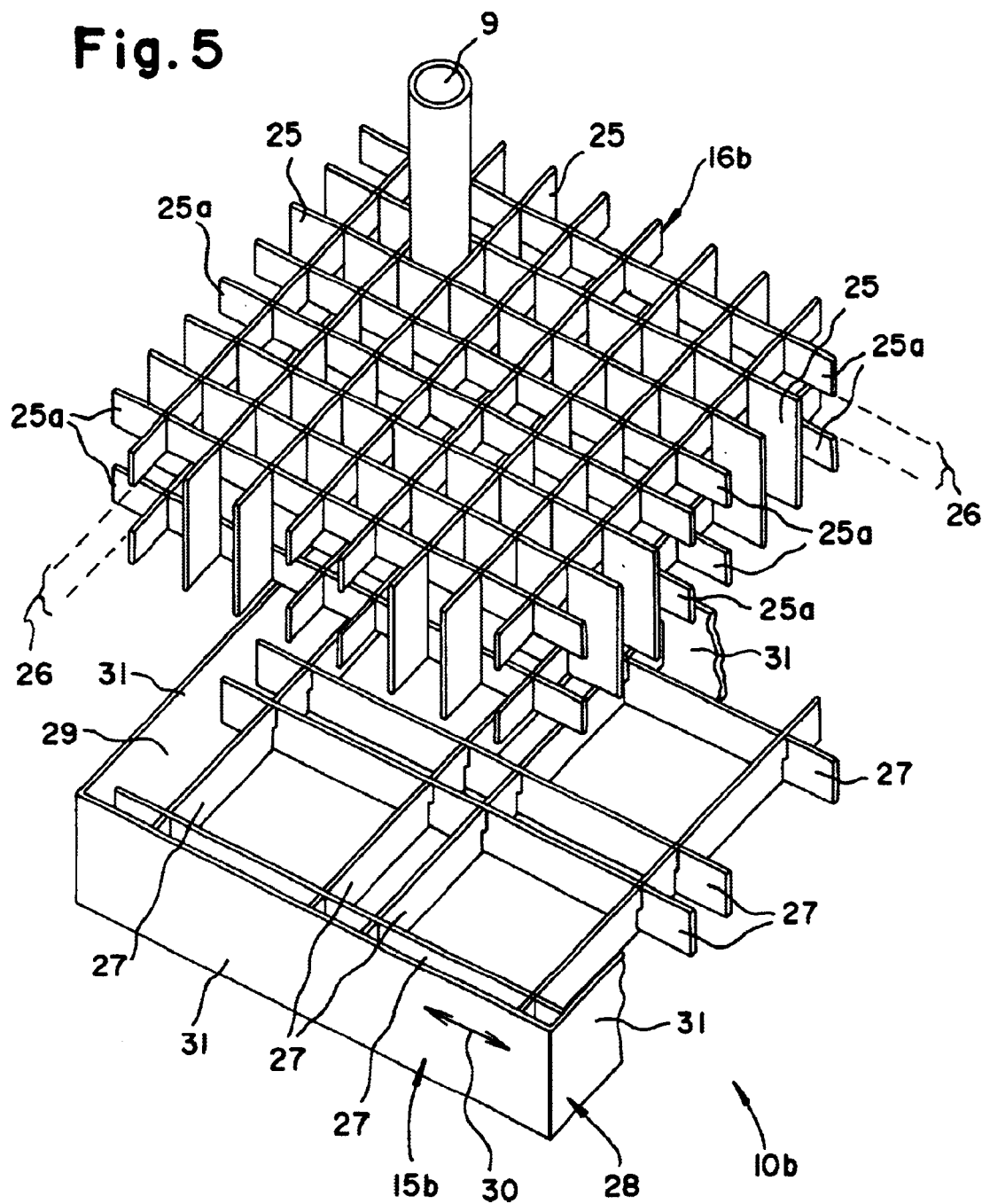
FIG. 5 is a diagrammatic perspective view of the two parts of a further exemplary embodiment of the spacer.
Figure 6:
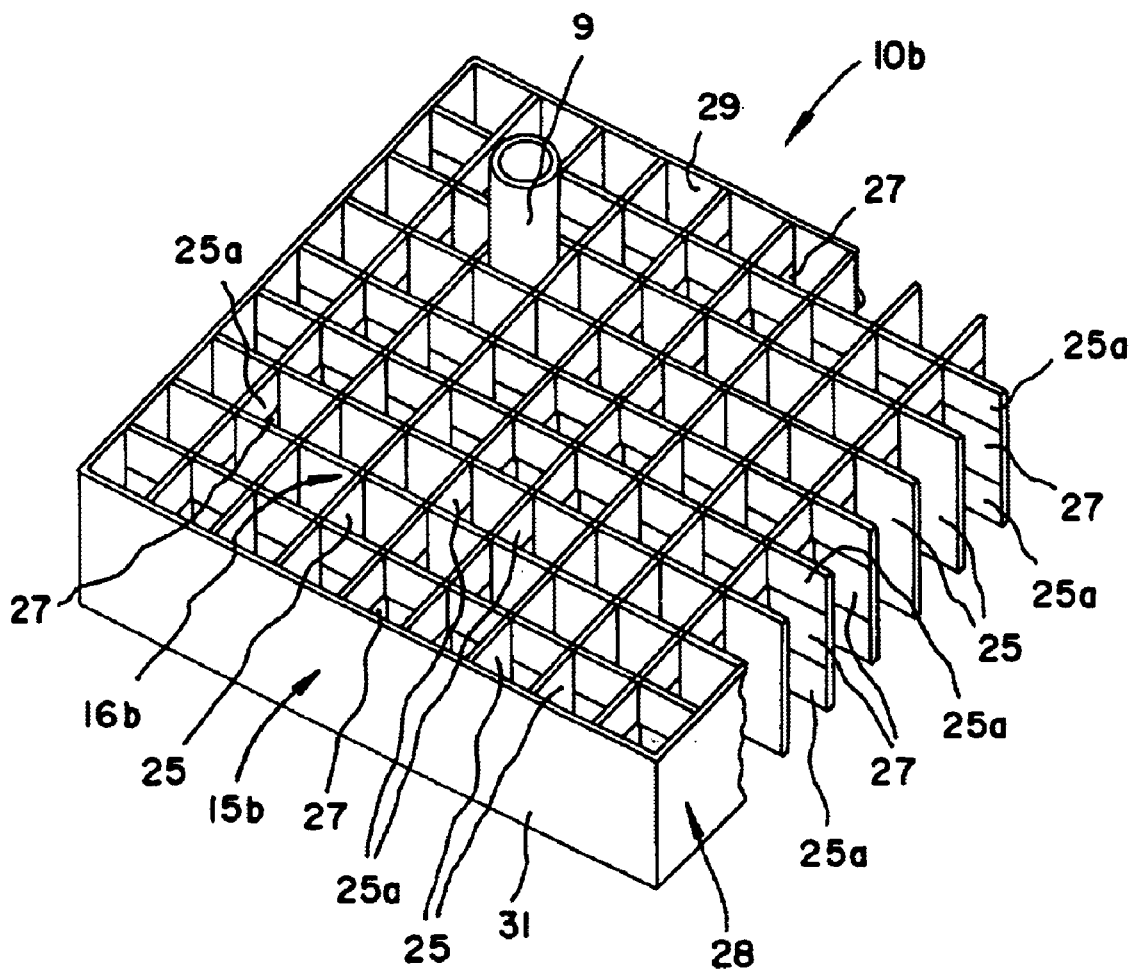
FIG. 6 is a diagrammatic perspective view of the spacer of FIG. 5 in an assembled state.
Figure 7:
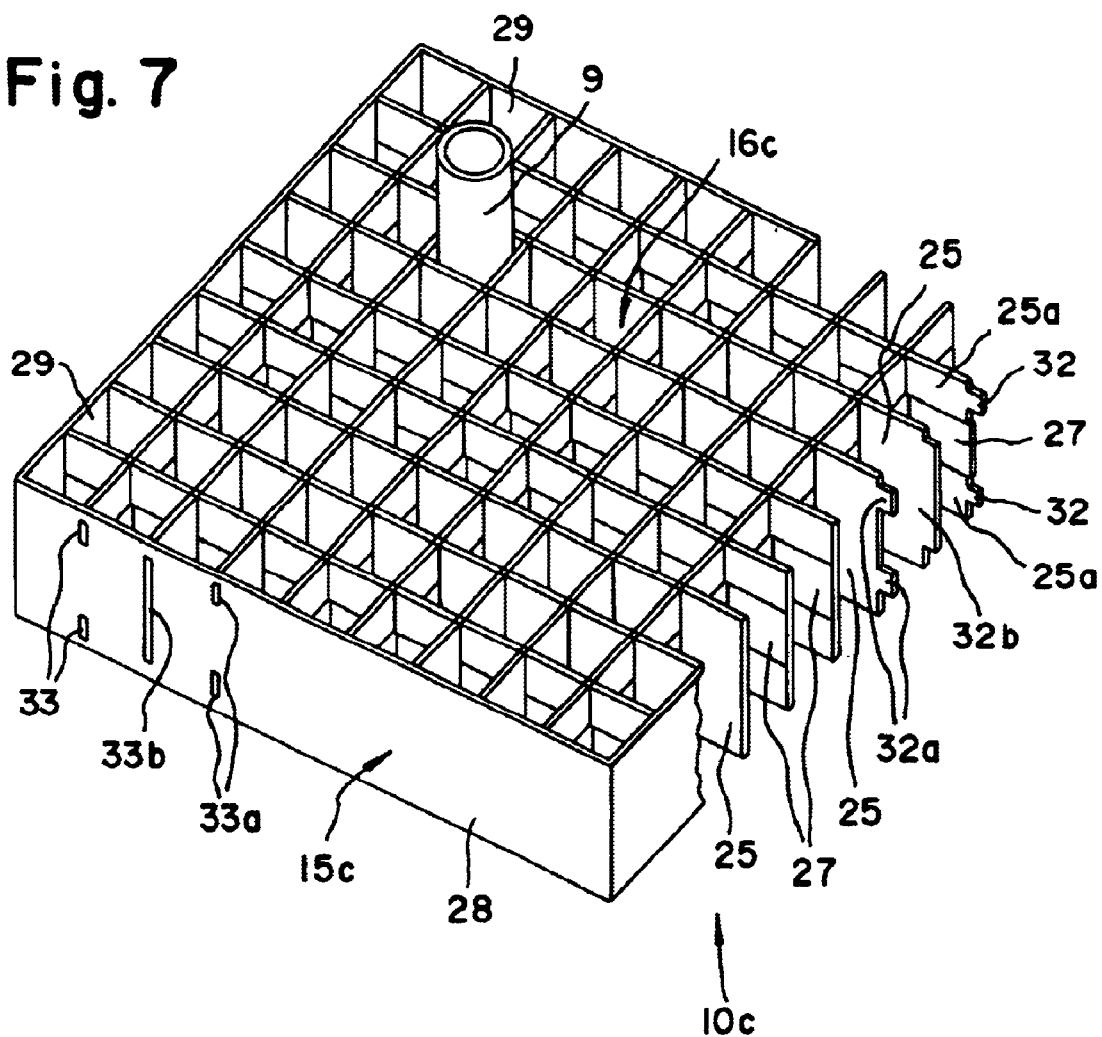
FIG. 7 is a diagrammatic perspective view of another embodiment of the spacer of FIG. 6.
Figure 9:
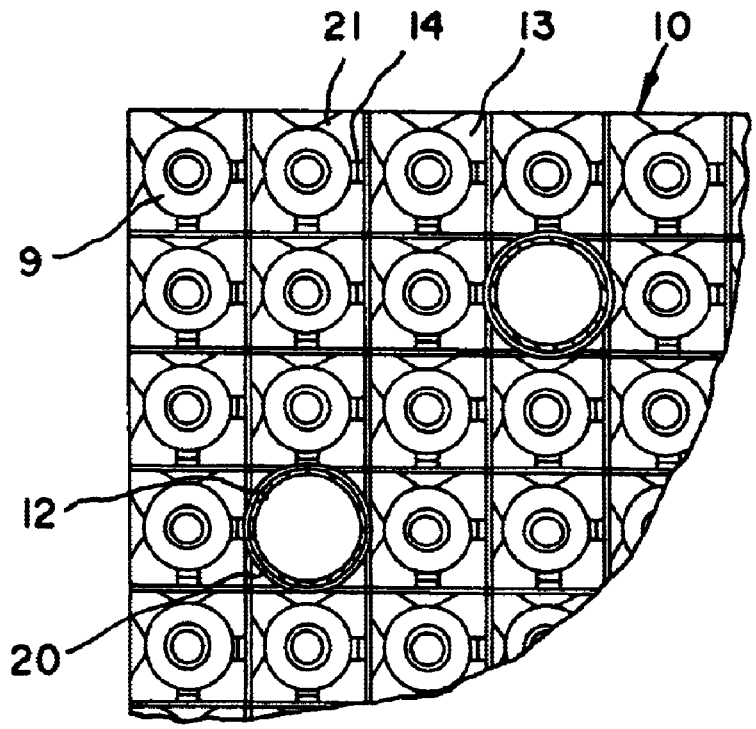
FIG. 9 is a fragmentary, plan view of a spacer with control rod guide tubes and rods disposed therein.

Referring now to the figures of the drawings in detail and first, particularly to FIG. 1 thereof, there is shown a fuel assembly 1 of a boiling water reactor disposed within a core shroud 3, which is disposed in the reactor pressure vessel 2, between an upper and a lower core grid 4, 5. A head part 6 is provided at the top side of the fuel assembly 1. A foot part 7 is provided at the bottom side of the fuel assembly 1. The parts 6, 7 have end sides that are remote from one another and have four bores B at the corners (FIG. 2). Non-illustrated centering pins that protrude from the core grids 4, 5, project into two diagonally opposite bores 8. The fuel rods 9 of a fuel assembly 1 or of a fuel-rod bundle are laterally fixed by spacers 10. The fuel assembly also includes several control rod guide tubes 12. The spacers 10 and also the entire outer contour of the fuel assembly are substantially square in cross section and have a multiplicity of cells 13 (for example, 18×18, as shown in FIG. 2, or 9×9, as shown in FIG. 3). The fuel rods 9 and control rod guide tubes 12 pass through the cells 13. Bosses 14 and springs 21 project inwards from the cell walls (in order to fix the fuel rods). See FIG. 9.

Turning now to FIGS. 3–7, the spacers 10a, 10b, 10c have two different parts, namely a radially outer first part 15a, 15b, 15c and an inner part 16a, 16b, 16c surrounded by the first part. The first part is produced from the same material as the core grids 4, 5 are (namely, from austenitic steel, and the second part is produced from Zircaloy. In all the spacers, the cells 13 are substantially square in cross section.

In the case of the spacer 10a (FIGS. 3–4), the first part 15a is formed of a single row of cells forming a square. On the outer side, the part 15a is delimited by four edge webs 17, and on the inner side by four inner webs 18. The partitions between the cells 13 are formed by webs 19, which in each case extend at right angles to two mutually associated edge and inner webs 17, 18. In each of the inner corners of the part 15a, there is a cell 13' by which the part 15a is fixed to four control rod guide tubes 12 (in each case, only one of these can be seen in FIGS. 3 and 4). For this purpose, radially widened regions 20, which together with the cell 13' and/or the webs surrounding them form an axially active undercut, are provided at the control rod guide tubes 12.

The second part 16a of the spacer 10a includes six longitudinal webs 22 and six transverse webs 23, which are fitted crosswise into one another. The length of the webs 22, 23 corresponds to the width of seven cells. Edge webs 24, which are two cell widths shorter than the longitudinal and transverse webs 22, 23, are fitted to the end edges of the webs 22 and 23. Overall, the result is a structure that fills the interior space of the first part 15a. The two parts 15a, 16a may be fitted into one another tightly or with a small clearance.

In the case of the spacer l0b (shown in FIGS. 5–6), the inner part 16b (similar to the exemplary embodiment shown in FIGS. 3–4), is composed of webs 25 made of Zircaloy which are fitted crosswise into one another. The webs 25 are all of the same length; therefore, the part 16b is substantially square in cross section. In each case, the two central and two outer webs are formed by two partial webs 25a, which leave an intermediate space 26 clear between them.

An expansion web 27, which is made of austenitic steel is fitted into each of the intermediate spaces 26, and is soldered to the first part 15b by its end sides. The first or outer part 15b is a frame 28, which is formed from edge webs 31, and in the installed state (FIG. 6), surrounds the interior second part 16b. The webs 27 may be of the same length as the webs 25 or may be slightly longer (than webs 25); in the latter case, there is a small clearance between the end edges of the webs 25 and the inner side 29 of the frame 28.

To increase the stability of the spacer 10b, the end regions of the webs 27 may be secured against lateral tilting on the first part 15b by a positively locking connection, which acts in the longitudinal direction 30 of the respective edge web 31 of the frame 28. This can be achieved, for example, by one or more lugs 32, which are formed integrally on the end edge of all or some of the webs 25, 25a and which extend into correspondingly configured slits 33 in the frame 28. A clearance is provided between the lugs 32 and the edges of the slits 33, so that the frame 28 can expand without any obstacles when heated.

Furthermore, it is conceivable for two lugs 32a, which are spaced apart from one another, or one lug 32b, which extends over a relatively large height range of the web 25, to be present on one web 25, and to be interacting with correspondingly configured slits 33a, 33b in the frame 28.

Figure 8:
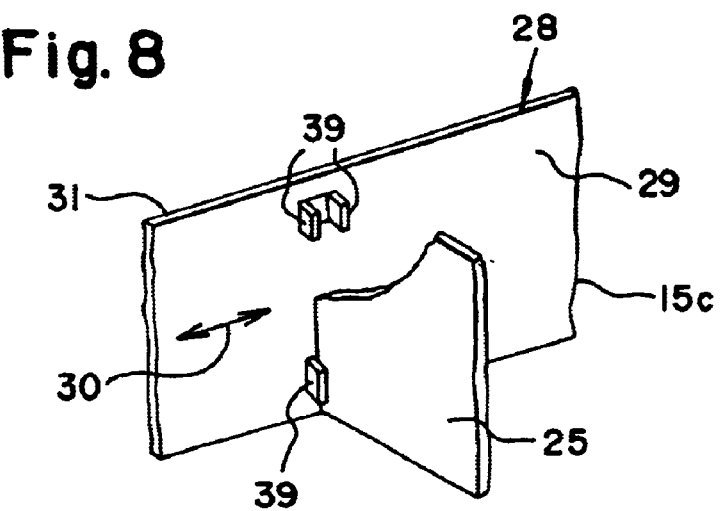
FIG. 8 is a fragmentary view of the spacer of FIG. 6.

Another possibility of producing a positively locking connection between the part 16b and the frame 28 is shown in FIG. 8. Projections 39, which are spaced apart from one another in the web longitudinal direction 30, are provided on the inner side 29 of the frame 28. The projections 39 enclose the end-edge region of a single-part web 25 with a clearance between them. The clearance ensures that the frame 28 can expand without obstacle. In the example shown in FIG. 8, the projections are positioned in the region of the upper and lower edges of the frame 28 and are produced by stamping followed by bending inward.

During loading of a reactor pressure vessel 2 or of the core shroud 3 with fuel assemblies 1 (to ensure safe loading and subsequent unloading between the fuel assemblies), a loading gap 34 (FIG. 10) of approximately 1 mm is required. The gap would be reduced in size when conventional Zircaloy spacers are used (due to the material growth as a result of neutron irradiation). For production reasons, the growth takes place in the longitudinal direction of the webs of the spacer, i.e., the latter expands in size.

Accordingly, if, after a prolonged operating period, a fuel assembly needs to be replaced, the size of the loading gap 34 is reduced by an amount that corresponds to the material growth on the spacer. The material growth is now usually taken into account from the outset by using a correspondingly reduced pitch (or edge length) of the spacers 10, 10'.

Therefore (at the time of loading), there is a gap 35 between two adjacent conventional spacers 10, 10', which is composed of the required loading gap 34 and a compensation gap 36, which takes the material growth into account.

Figure 10:
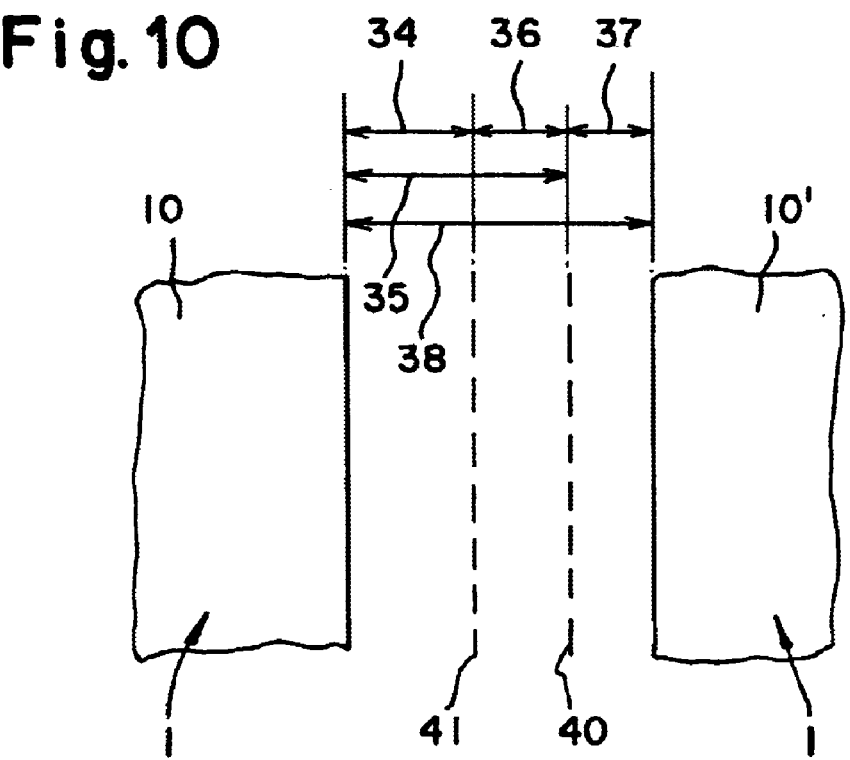
FIG. 10 is an illustration of gap space conditions for conventional fuel assemblies and fuel assemblies according to the invention.

In FIG. 10 (which represents the gap space conditions not to scale), the corresponding distance from the spacer 10' to the spacer 10 is indicated by the dashed line 40. The dashed line 41 shows the position of the spacer 10' in a state in which the gap space is limited to the loading gap 34. Temperatures in the region of 250° C. prevail in operation. During heating (to the operating temperature), the core grids 4, 5 holding the fuel assemblies 1 and the core shroud 3 expand. Due to the different thermal expansions between the core grids 4, 5 and conventional spacers (austenitic steels have a coefficient of thermal expansion of approximately $18 \times 10^{-6}$ mm/mm °C., whereas Zircaloy has a coefficient of thermal expansion of only $5 \times 10^{-6}$ mm/mm °C.), the gap 35, which is present in the loading state is increased in size again by an expansion gap 37.

Therefore, the operating gap 38, which is present at the aforementioned high temperatures is considerably larger than the loading gap 34. If the entire fuel assembly configuration or a row or a spoke of fuel elements extending linearly between the walls of the core shroud 3 is subjected to load on one side, (for example, due to pressure differences in the cooling water, which flows at a very high flow velocity), the individual fuel assemblies may be bent because of the relatively wide gap 38 which is present between them, and gap spaces of 10–20 mm may form as a result of cumulative effects. A drawback in this context is that the quantity of water surrounding a fuel rod is increased in the corresponding regions, thereby increasing the moderation and the output. However, the increase in output is not taken into account in the configuration of the fuel rods; consequently, there is a risk of exceeding the boiling transition output, within the ranges mentioned.

A further drawback is that, due to the considerable bending, the control rods are prevented from moving into their guide tubes, and an emergency shutdown of the reactor is delayed. With the fuel assemblies, which are equipped with the spacers described above, such a bending is only possible to a reduced extent. The fact that the radially outer part of the spacer 10 is produced from the austenitic steel of the core grids 4, 5 means that the radially outer part expands horizontally to the same degree as the core grids 4, 5, when heated. The expansion gap 37 is therefore reduced in size compared to the conventional spacers, which are entirely made of Zircaloy. The drawback that austenitic steel has a greater neutron absorption than Zircaloy, and accordingly has an adverse effect on the neutron economy, can be alleviated by the fact that the spacers are only used in the central region of the fuel assemblies. It is even possible that a single spacer of the type may be sufficient in the region.

Although the inner second part 16a, b of the spacer is still subject to material growth, this only affects the respective fuel assembly itself. This is because the inner part 16a, b grows in the radial or horizontal direction into the gap, which is present between the inner part 16a, b and the outer part 15, b (at least in the operating state). If such a gap is not provided from the outset, it is formed as a result of the outer part 15a, b, which is made of austenitic steel, expanding to a greater extent than the inner part 16a, b. Overall, therefore, the gap space, which is present in the operating state is substantially restricted to the loading gap 34. Accordingly, the bending of a fuel assembly or of an entire row of fuel assemblies is only possible to a lesser extent than with a conventional configuration.

We claim:

1. A fuel assembly for a pressurized-water reactor, comprising:
    spacers having cells;
    control rod guide tubes;
    fuel rods held laterally in said cells of said spacers;
    a headpiece and a foot piece for fixing the fuel assembly to upper and lower core grids respectively inside a reactor pressure vessel;
    at least one of said spacers having a first part disposed on a radially outer side with respect to a longitudinal center axis of the fuel assembly, and a second part disposed on a radially inner side and completely surrounded by said first part; and
    said second part formed of Zircaloy, and said first part containing a metallic material having a lower growth in a radial direction caused by neutron radiation and a higher coefficient of thermal expansion when compared with said Zircaloy of said second part, thereby reducing expansion gaps between fuel assemblies.

2. The fuel assembly according to claim 1, wherein said first part is formed of a same material as the core grids.

3. The fuel assembly according to claim 1, wherein said first part is formed of austenitic steel.

4. The fuel assembly according to claim 1, further comprising a central region, said at least one spacer disposed in said central region of the fuel assembly.

5. The fuel assembly according to claim 1, wherein said first part has an inner side;
    a radially outer control rod guide tube is disposed on said inner side of said first part; and
    individual cells are each axially fixed to said radially outer control rod guide tube, and said first and second parts are disposed as separate parts.

6. The fuel assembly according to claim 1, wherein said second part is formed of webs fitted crosswise into one another, said webs are formed of two partial webs forming therebetween a space extending over an entire web length, and said space contains an expansion web formed of the same metallic material as said first part and having ends fixed at said inner side of said first part.

7. The fuel assembly according to claim 6, wherein said first part is a frame formed of edge webs.

8. The fuel assembly according to claim 7, further comprising a positively locking connection acting in a longitudinal direction of a corresponding one of said edge webs.

9. The fuel assembly according to claim 8, wherein said edge webs and said partial webs have end regions and at least one of said end regions is secured against lateral tilting at said first part by, said positively locking connection.

10. A fuel assembly for a pressurized-water reactor, comprising:
    spacers having cells;
    control rod guide tubes;
    fuel rods held laterally in said cells of said spacers; a headpiece and a foot piece for fixing the fuel assembly to upper and lower core grids respectively inside a reactor pressure vessel;
    at least one of said spacers having outer edge webs, said at least one spacer having a first part disposed on a radially outer side with respect to a longitudinal center axis of the fuel assembly and having said outer edge webs, and said at least one spacer having a second part disposed on a radially inner side and completely surrounded by said first part; and
    said second part formed of Zircaloy, and said first part containing a metallic material having a lower growth in a radial direction caused by neutron radiation and a higher coefficient of thermal expansion when compared with said Zircaloy of said second part, thereby reducing expansion gaps between fuel assemblies.

* * * * *